US006721426B1

(12) United States Patent
Kurisu et al.

(10) Patent No.: US 6,721,426 B1
(45) Date of Patent: Apr. 13, 2004

(54) SPEAKER DEVICE

(75) Inventors: Hirofumi Kurisu, Kanagawa (JP); Yuji Yamada, Tokyo (JP)

(73) Assignees: Sony Corporation, Tokyo (JP); Keio University, Tokyo (JP)

( * ) Notice: Subject to any disclaimer, the term of this patent is extended or adjusted under 35 U.S.C. 154(b) by 693 days.

(21) Appl. No.: 09/694,976

(22) Filed: Oct. 24, 2000

(30) Foreign Application Priority Data

Oct. 25, 1999 (JP) .......................................... 11-302663

(51) Int. Cl.[7] .............................................. H04M 11/00

(52) U.S. Cl. .............................. 381/63; 381/74; 381/17

(58) Field of Search ............................. 379/63, 17, 18, 379/309, 310; 84/630, 707, DIG. 26

(56) References Cited

U.S. PATENT DOCUMENTS 5,687,239 A * 11/1997 Inanaga et al. ............. 381/309
5,757,931 A * 5/1998 Yamada et al. ............... 381/61
5,796,845 A * 8/1998 Serikawa et al. ............. 381/18
5,974,152 A * 10/1999 Fujinami ....................... 381/1
6,108,430 A * 8/2000 Kurisu ....................... 381/310
6,563,869 B1 * 5/2003 Yamada ...................... 375/232
6,614,912 B1 * 9/2003 Yamada et al. ............. 381/310

* cited by examiner

*Primary Examiner*—Stella Woo
(74) *Attorney, Agent, or Firm*—Jay H. Maioli

(57) ABSTRACT

A signal processor with a small circuit size, a simplified arrangement, and reduced cost and which can generate the same sound field as that in a case of listening to a reproduced sound using speakers to a location outside of a head of the listener has FIR filters and reverberation adding circuits. At an addition point provided to a tap midpoint of one FIR filter, a delay output signal of a tap end from another FIR filter is multiplied by a predetermined multiplication coefficient and then added. Output of one FIR filter is subjected to reverberation adding processing by the reverberation adding circuits and then output of yet another FIR filter is added to the above output to obtain an output signal. Therefore, even if the FIR filters with short tap lengths are used, long impulse response can be reproduced and a scale of signal processing can be reduced substantially.

3 Claims, 6 Drawing Sheets

SPEAKER DEVICE

BACKGROUND OF THE INVENTION

1. Field of the Invention

The present invention relates to a signal processor for reproducing an impulse response representing a transmission characteristic between two points of a transmitting system calculated in advance by measurement or calculation and a headphone device and a speaker device for which the signal processor is used.

2. Description of the Related Art

Conventionally, there is proposed an out-of-head audio image localizing headphone device in which an audio image formed by respective input audio signals from a left front sound source LF, a right front sound source RF, a left back sound source LB, and a right back sound source RB with respect to a listener is localized on an outside of the listener head.

FIG. 6 shows an arrangement of a prior-art out-of-head audio image localizing headphone device. In FIG. 6, the out-of-head audio image localizing headphone device is formed of input terminals 101 to 104 to which four-channel audio signals of the above left front sound source LF, right front sound source RF, left back sound source LB, and right back sound source RB are supplied, A/D (Analog-Digital) converters (AD1 to AD4) 105 to 108 for converting input audio signals into digital signals, a signal processor 109 for applying predetermined signal processing to the input audio signals converted into the digital signals, D/A (Digital-Analog) converters (DA1 and DA2) 110 and 111 for respectively converting outputs of the signal processor 109 into analog signals, amplifiers (AM1 and AM2) 112 and 113 for respectively amplifying the audio signals converted into the analog signals, and a headphone 114 to which the amplified audio signals are respectively supplied.

FIG. 7 is a block diagram showing an arrangement of a prior-art signal processor. In FIG. 7, the signal processor 109 is formed of digital FIR filters (F1 to F8) 125 to 132 for convoluting respective impulse responses from the above four-channel sound sources to a left ear and a right ear of the listener calculated in advance by measurement or calculation to input audio signals DLF, DRF, DLB, and DRB converted into the digital signals and supplied to input terminals 121 to 124, a pair of adding circuits 133 to 138 for respectively adding outputs of left channels and right channels of the digital FIR filters (F1 to F8) 125 to 132, and output terminals 139 and 140 for outputting outputs of the adding circuits 133 to 138 as output signals.

By the above prior-art headphone device, the same sound field as that in a case of listening to a reproduced sound obtained by reproducing four-channel input audio signals by a speaker was intended to be generated on an outside of a head of the listener.

However, according to the above-described prior-art headphone device, if the same sound field as that in the case of listening to a reproduced sound obtained by reproducing by a speaker was intended to be generated on an outside of a head of the listener, it was necessary to enormously increase a length of the impulse response convoluted by each of the digital FIR filters within the headphone device. Therefore, if each of the digital FIR filters was formed by using a digital signal processing IC (integrated circuit), the digital signal processing IC mounted with a high-speed product-sum operating circuit and a large number of memories was necessary. Thus, a size of the circuit increased and the system became extremely expensive.

It is an object of the invention to provide a signal processor in which the above problems are solved, a size of the circuit is reduced, an arrangement is simplified, a cost is reduced, and the same sound field as that in a case of listening to a reproduced sound obtained by reproducing by a speaker can be generated on an outside of a head of a listener and to provide a headphone device and a speaker device for which the signal processor is used.

Specifically, it is an object to provide a digital signal processor in which FIR filters for convoluting impulse responses are formed and which can perform convolution of the impulse responses having approximate lengths and characteristics to those of actual impulse responses by using the FIR filters with relatively short tap lengths.

SUMMARY OF INVENTION

A signal processor of the present invention is applied to a signal processor for carrying out predetermined signal processing by signal processing means for convoluting impulse responses from sound sources to a measurement point calculated in advance by measurement or calculation to input audio signals of a plurality of channels and outputting the signals.

The signal processing means divides the input audio signals into two lines for respective channels and has finite-tap-length FIR filters respectively for the plurality of channels and reverberation adding circuits respectively for the first line and the second line. At an addition point provided to a tap midpoint of the FIR filter of one channel of the first and second lines, a delay output signal of a tap end from the FIR filter of the other channel of the first and second lines is multiplied by a predetermined multiplication coefficient and then added. Output of the FIR filter of the one channel of the first and second lines is subjected to reverberation adding processing by the reverberation adding circuits of the first and second lines and then output of the FIR filter of the other channel of the first and second lines is added to the output of the FIR filter of the one channel to obtain addition output as an output signal of the first and second lines of the signal processing means.

A headphone device of the invention is a headphone device to which the above signal processor is applied, the headphone device driving a headphone by an output left audio signal and an output right audio signal to localize an audio image by input audio signals on an outside of a head.

A speaker device of the invention is a speaker device to which the above signal processor is applied, the speaker device driving the two speakers by the output left audio signal and the output right audio signal to localize an audio image by the predetermined audio signals in a position other than the two speakers.

The invention has the following operations.

By properly choosing a position of the tap of the digital FIR filter of the one channel of the first and second lines into which the delay output signal multiplied by the predetermined multiplication coefficient is input, a length of impulse response reproduced by the digital FIR filter of the one channel of the first and second lines, the digital FIR filter of the other channel of the first and second lines, and the reverberation adding circuits can be increased, even if a length of the impulse response convoluted in the digital FIR filter of the other channel of the first and second lines is smaller than a length of the impulse response convoluted in the digital FIR filter of the one channel of the first and second lines.

A main portion representing a characteristic of the impulse response to be reproduced is convoluted by the digital FIR filter of the other channel of the first and second lines and the output of the digital FIR filter of the other channel is added to the reverberation output of the reverberation adding circuit with respect to the digital FIR filter of the one channel of the first and second lines. Therefore, even if a characteristic of a signal component of a portion to be processed of the delay signal output from the tap end of the digital FIR filter of the other channel of the first and second lines is different from the characteristic of the impulse response to be reproduced, a reproduced characteristic of the impulse response can be substantially the same as the desired characteristic of the impulse response.

As a result, the same sound field as that in a case of listening to a sound obtained by reproducing the above input audio signals by speakers disposed in positions of the sound sources can be generated on an outside of a head of the listener.

DETAILED DESCRIPTION OF THE PREFERRED EMBODIMENT

An embodiment of the present invention will be described bellow.

Figure 1:
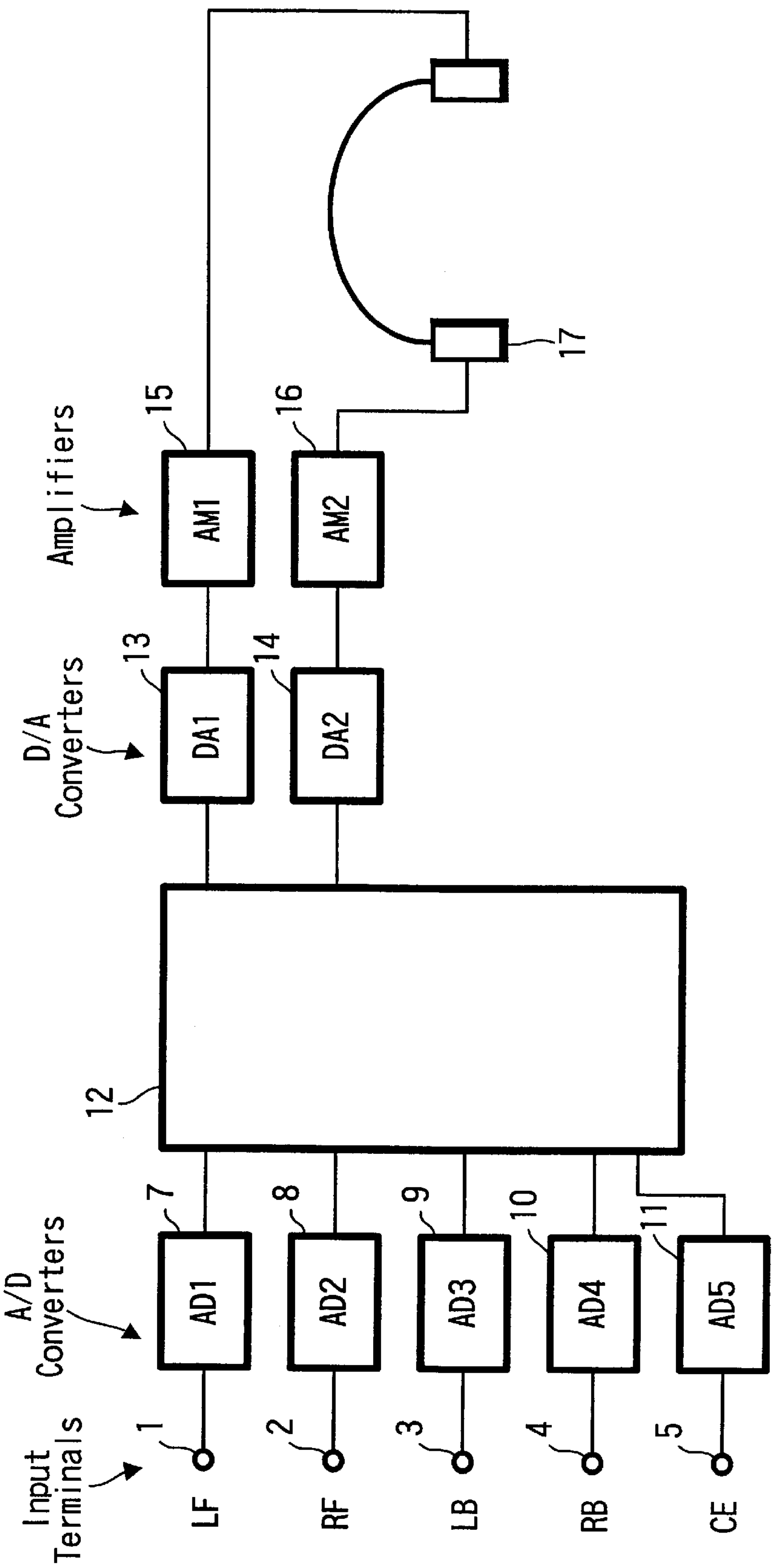
FIG. 1 is a diagram showing an arrangement of a headphone device of the present embodiment.
Figure 5:
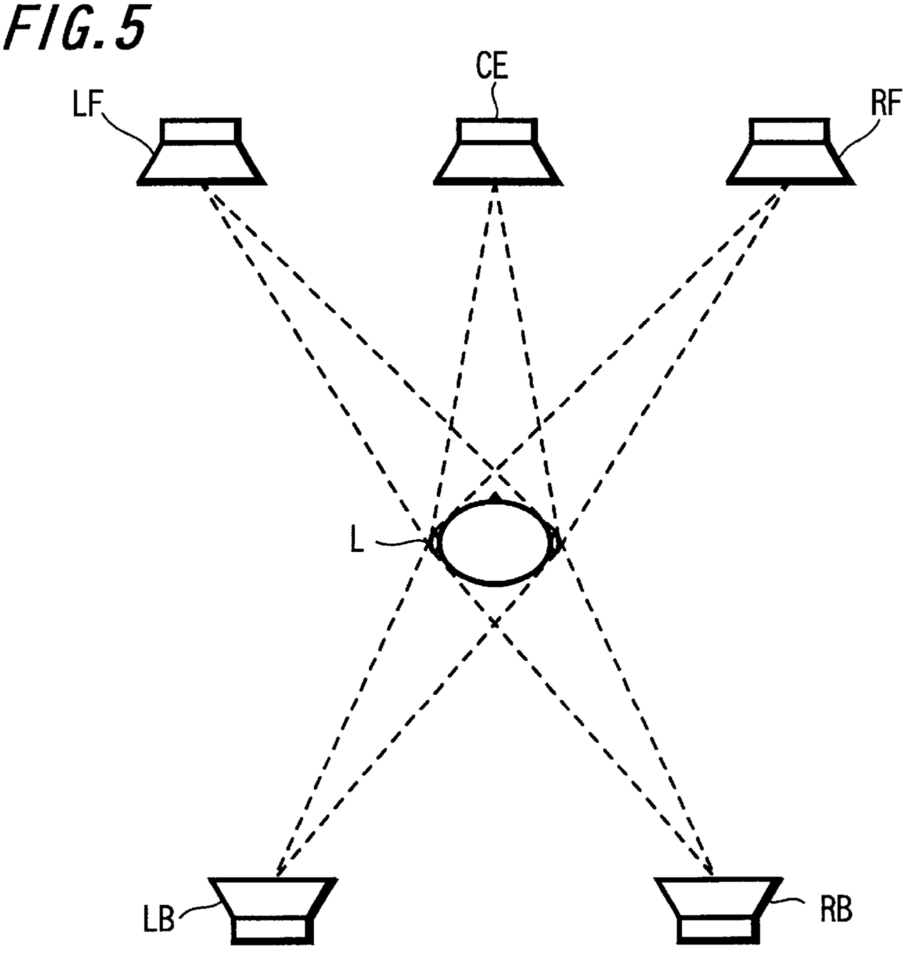
FIG. 5 is a diagram showing localization of sound sources.
Figure 6:
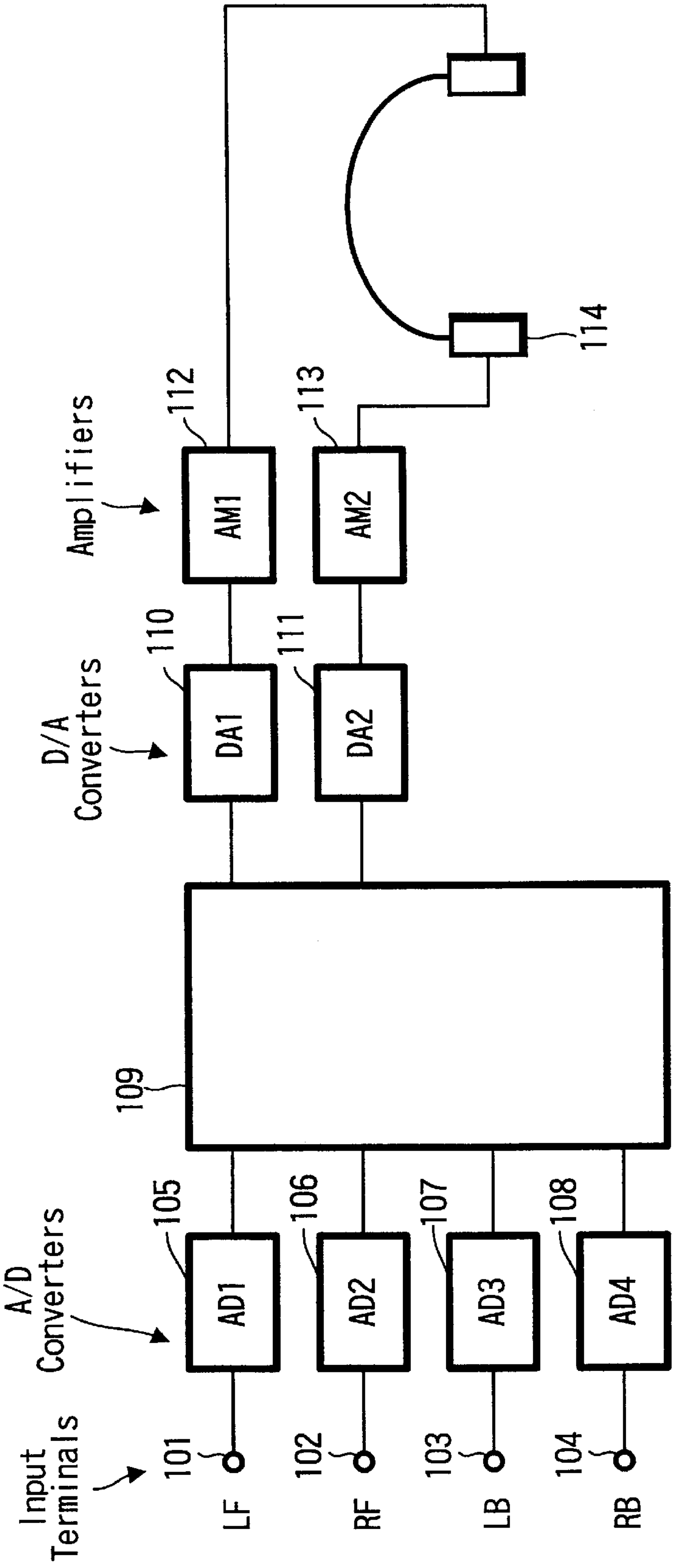
FIG. 6 is a diagram showing an arrangement of a prior-art headphone device.
Figure 7:
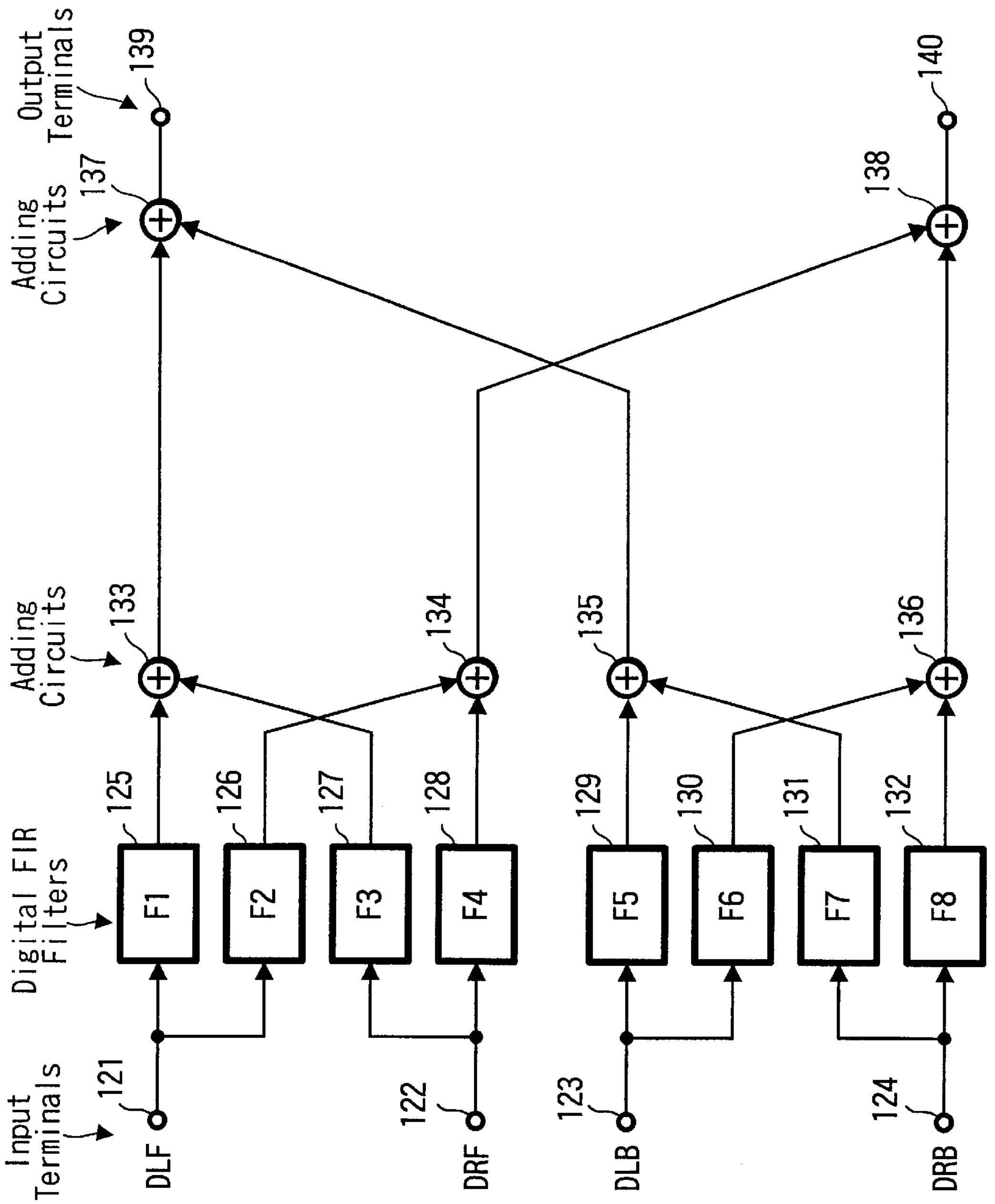
FIG. 7 is a block diagram showing an arrangement of a prior-art signal processor.

FIG. 1 shows an arrangement of the embodiment of the headphone device of the invention that is an out-of-head audio image localizing headphone device for localizing an audio image generated by respective input audio signals on an outside of a head, the signals being from a left front sound source LF, a right front sound source RF, a left back sound source LB, a right back sound source RB, and a central sound source CE with respect to a listener L as shown in FIG. 5.

In FIG. 1, The headphone device of the present embodiment is formed of input terminals 1 to 5 to which five-channel audio signals of the above left front sound source LF, right front sound source RF, left back sound source LB, right back sound source RB, and central sound source CE are supplied, A/D (Analog-Digital) converters (AD1 to AD5) 7 to 11 for converting input audio signals into digital signals, a signal processor 12 that is for applying predetermined signal processing to the input audio signals converted into the digital signals and that is formed of a DSP (Digital Signal Processor), for example, D/A (Digital-Analog) converters (DA1 and DA2) 13 and 14 for respectively converting output signals of the signal processor 12 into analog signals, amplifiers (AM1 and AM2) 15 and 16 for respectively amplifying the audio signals converted into the analog signals, and a headphone 17 to which the amplified audio signals are respectively supplied and which outputs a reproduced sound.

Details of an arrangement of the above signal processor 12 will be described later. In the present embodiment, the signal processor 12 applies signal processing such that the same sound field as that in a case of listening to a reproduced sound obtained by reproducing audio signals by speakers can be generated on an outside of a head of the listener when the audio signal converted by the signal processor 12 is reproduced by the headphone 17. Furthermore, the arrangement of the above signal processor 12 is simplified, a signal processing speed increases, and thus a signal processing amount increases substantially. Therefore, it is possible to substantially increase lengths of impulse responses convoluted by respective digital FIR filters within the above headphone device as compared with prior art. As a result, it is possible to obtain the above signal processor 12 by using a low-priced digital signal processing IC.

Figure 2:
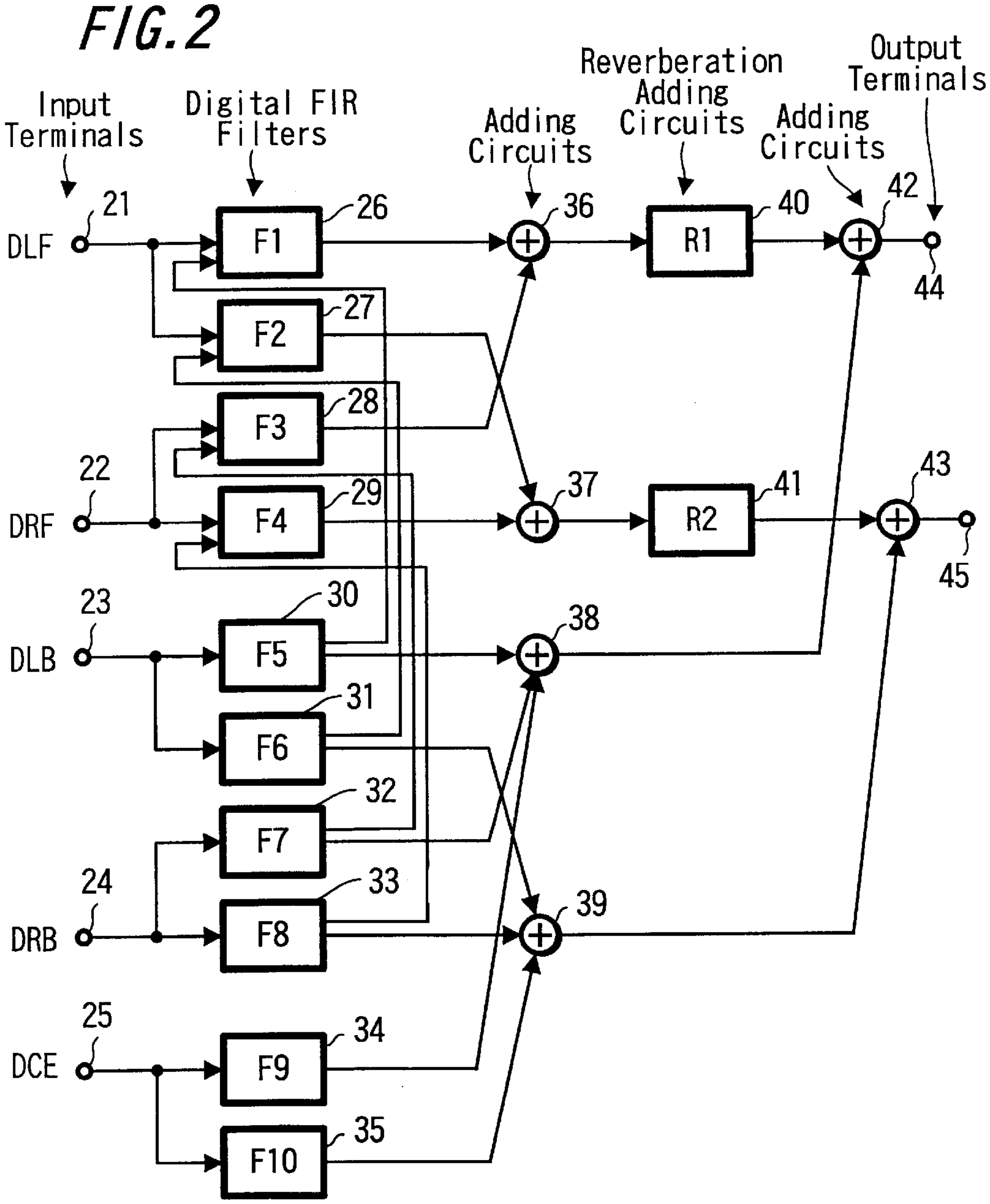
FIG. 2 is a block diagram showing an arrangement of a signal processor of the present embodiment.

FIG. 2 is a block diagram showing an arrangement of the signal processor of the embodiment.

In FIG. 2, the signal processor 12 is formed of digital FIR filters (F1 to F10) 26 to 35 for convoluting respective impulse responses from the above five-channel sound sources to a left ear and a right ear of the listener calculated in advance by measurement or calculation to input audio signals DLF, DRF, DLB, DRB, and DCE converted into digital signals and supplied to input terminals 21 to 25, a pair of adding circuits 36 to 39 for respectively adding outputs of left channels and right channels of the digital FIR filters (F1 to F10) 26 to 35, reverberation adding circuits 40 and 41 to which outputs from the adding circuits 36 and 37 are supplied as input signals, a pair of adding circuits 42 and 43 for respectively adding outputs of left channels and right channels of the reverberation adding circuits 40 and 41 and the adding circuits 38 and 39, and output terminals 44 and 45 for outputting outputs of the adding circuits 42 and 43 as output signals.

In the signal processor with the above arrangement, to the FIR filters 26 to 35 and the reverberation adding circuits 40 and 41, at addition points provided to tap midpoints of the FIR filters 26 to 29, delay output signals at tap ends from the FIR filters 30 to 33 multiplied by a predetermined multiplication coefficient as described later are added. After reverberation adding processing is applied by the reverberation adding circuits 40 and 41 to outputs of left channels and right channels of the FIR filters 26 to 29, outputs of the left channels and the right channels of the FIR filters 30 to 35 are respectively added to outputs of the reverberation adding circuits for the left channel and right channel to obtain output signals.

By such a headphone device, the same sound field as that in a case of listening to a reproduced sound obtained by reproducing the five-channel input audio signals by speakers is generated on an outside of a head of the listener.

Here, by reference to FIGS. 3 and 4, details of the arrangement of the signal processing of the above signal processor 12 will be described.

Figure 3:
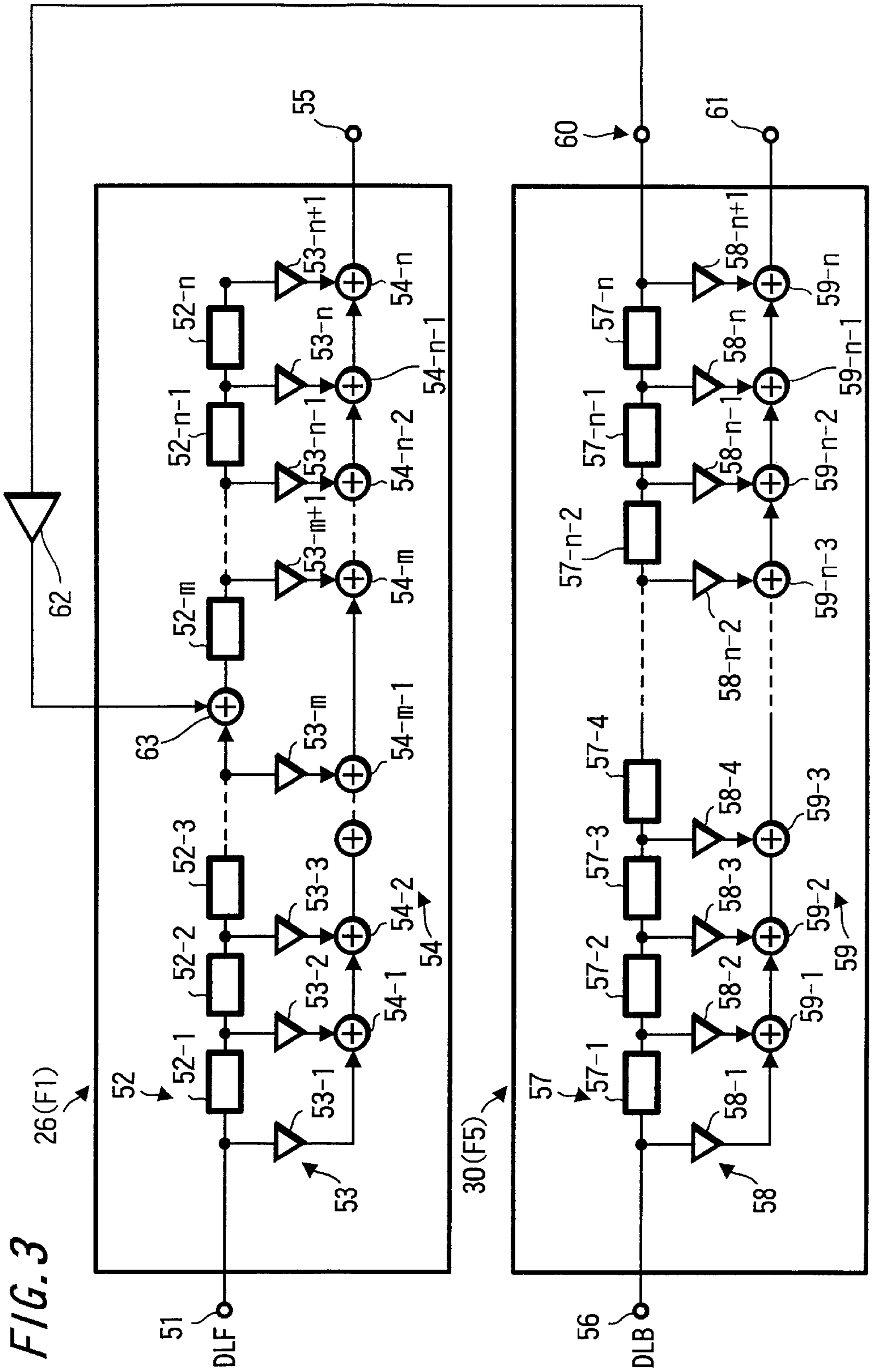
FIG. 3 is a block diagram of digital FIR filters.

FIG. 3 is a block diagram of the digital FIR filters of the signal processor of the present embodiment. FIG. 3 shows a relationship between the digital FIR filter (F1) 26 and the digital FIR filter (F5) 30. Relationships between the digital FIR filter (F2) 27 and the digital FIR filter (F6) 31, between the digital FIR filter (F3) 28 and the digital FIR filter (F7) 32, and between the digital FIR filter (F4) 29 and the digital FIR filter (F8) 33 are similar to the above relationship between the digital FIR filter (F1) 26 and the digital FIR filter (F5) 30. Therefore, details of signal processing operation of the above signal processor will be described below by using the relationship between the digital FIR filter (F1) 26 and the digital FIR filter (F5) 30.

In the above digital FIR filter (F1) 26, a plurality of delay devices 52 (52-1 to 52-n) are connected in series to an input terminal 51 to which the digital signal DLF is input. Tapped delay lines for delay processing of input audio signals of the digital signal DLF are provided to the respective delay devices 52-1 to 52-n, a plurality of multipliers 53 (53-1 to 53-n+1) for multiplying signals of respective taps of the delay lines by a coefficient are provided in parallel, adders 54 (54-1 to 54-n) for successively adding output signals of the plurality of multipliers 53-1 to 53-n+1 are provided to be connected in series, and an output signal is output from an output terminal 55.

Similarly, in the digital FIR filter (F5) 30, a plurality of delay devices 57 (57-1 to 57-n) are connected in series to an input terminal 56 to which the digital signal DLB is input. Tapped delay lines for delay processing of input audio signals of the digital signal DLB are provided to the respective delay devices 57-1 to 57-n, a plurality of multipliers 58 (58-1 to 58-n+1) for multiplying signals of respective taps of the delay lines by a coefficient are provided in parallel, adders 59 (59-1 to 59-n) for successively adding output signals of the plurality of multipliers 58-1 to 58-n+1 are provided to be connected in series, and an output signal is output from an output terminal 61.

Figure 4:
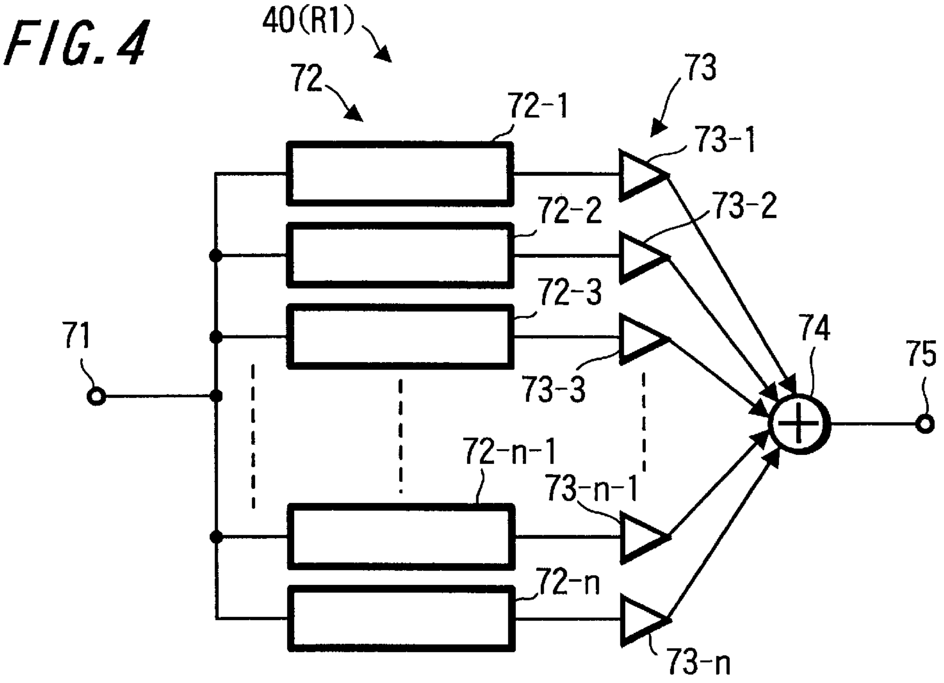
FIG. 4 is a block diagram of a reverberation circuit.

FIG. 4 is a block diagram of the reverberation adding circuit of the signal processor of the present embodiment.

Because the reverberation adding circuit (R1) 40 and the reverberation adding circuit (R2) 41 have the same arrangement, only the arrangement of the reverberation adding circuit (R1) 40 will be described here.

In the above reverberation adding circuit (R1) 40, a plurality of delay devices 72 (72-1 to 72-n) are provided in parallel to an input terminal 71, a plurality of multipliers 73 (73-1 to 73-n) for multiplying delay outputs of the plurality of respective delay devices 72-1 to 72-n by a predetermined coefficient are provided in parallel, an adder 74 for adding multiplication outputs of the plurality of multipliers 73-1 to 73-n is provided, and an addition output of the adder 74 is supplied to an output terminal 75.

Next, details of the signal processing operation of the above signal processor 12 will be described by reference to FIGS. 3 and 4.

In the digital FIR (Finite Impulse Response) filter (F1) 26 that is a finite-length digital filter and has the above arrangement, a so-called convolution operation in which the digital signal DLF is delayed by the delay devices 52, multiplied by the predetermined coefficient by the multipliers 53, and added by the adders 54 is performed. Thus, the digital signal to which a predetermined impulse response is convoluted is supplied to the reverberation adding circuit (R1) 40.

In the reverberation adding circuit (R1) 40, the signal is subjected to delay processing by the plurality of delay devices 72. By choosing proper values for the number of delay elements of each of the delay devices 72 and the multiplication coefficient of each of the multipliers 73 in view of a position of the sound source of the input audio signal DLF, a length of the impulse response reproduced by the digital FIR filter (F1) 26 and the reverberation adding circuit (R1) 40 increases, even though a length of the impulse response convoluted in the digital FIR filter (F1) 26 is small. As a result, the same sound field as that in the case of listening to a reproduced sound obtained by reproducing the above input audio signals by speakers disposed in positions of the sound sources can be generated on an outside of a head of the listener.

Next, in the digital FIR filter (F5) 30, a so-called convolution operation in which the input audio signal DLB is delayed by the delay devices 57, multiplied by the predetermined coefficients by the multipliers 58, and added by the adders 59 is performed similarly.

Here, a delay signal output from a delay device output terminal 60 connected to the tap of the delay line in a back stage of the delay device 57-n of the digital FIR filter (F5) 30 is multiplied by a predetermined coefficient by a multiplier 62 and a multiplication output of the multiplier 62 is added to a delay signal supplied to an adder 63 provided to the tap of the delay line in a front stage of the delay device 52-m (n>m) in a predetermined position of the above digital FIR filter (F1) 26.

An output from the output terminal 61 of the digital FIR filter (F5) 30 and an output of the reverberation adding circuit (R1) 40 are added by the adding circuit 42 and an output signal is output from the output terminal 44.

Here, by properly choosing the multiplication coefficient of the multiplier 62 and the position of the tap of the delay line in the front stage of the delay device 52-m (n>m) of the digital FIR filter (F1) 26 to which the delay signal to which the output of the multiplier 62 is added is input, a length of the impulse response reproduced by the digital FIR filter (F5) 30, the digital FIR filter (F1) 26, the reverberation adding circuit (R1) 40 and the adding circuit 42 can be increased, even though a length of the impulse response convoluted in the digital FIR filter (F5) 30 is smaller than a length of the impulse response convoluted in the digital FIR filter (F1) 26.

A main portion representing a characteristic of the impulse response to be reproduced is convoluted by the digital FIR filter (F5) 30 and the output of the digital FIR filter (F5) 30 is added to the reverberation output of the reverberation adding circuit (R1) 40 with respect to the impulse response convoluted in the digital FIR filter (F1) 26 by the adding circuit 42 in the last stage. Therefore, even if a characteristic of a signal component of a portion to be processed of the delay signal output from the delay device output terminal 60 of the digital FIR filter (F5) 30 is different from the characteristic of the impulse response to be reproduced, a reproduced characteristic of the impulse response can be substantially the same as the desired characteristic of the impulse response.

As a result, the same sound field as that in a case in which the listener L is listening to a reproduced sound obtained by reproducing the above input audio signals by speakers disposed in positions of the left front sound source LF, right front sound source RF, left back sound source LB, right back sound source RB, and central sound source CE as shown in FIG. 5 can be generated on an outside of a head of the listener L.

By the operation of the digital FIR filters in the signal processor of the above embodiment, an initial reflected sound of a predetermined impulse response based on the input audio signal may be generated to generate primary reverberation sound and secondary reverberation sound by operation of the reverberation adding circuits. As a result, by increasing a length of the impulse response of the reproduced initial reflected sound, localization of the sound source can be achieved further effectively. By increasing lengths of impulse responses of the primary reverberation sound as well as the secondary reverberation sound, density of the impulse response can be increased. Therefore, it is possible to generate a reproduced sound with presence and high quality.

With regard to the position of the tap of the delay line in the back stage of the delay device 57-n of the digital FIR filter (F5) 30 and the position of the tap of the delay line in the front stage of the delay device 52-m (n>m) of the digital FIR filter (F1) 26 in the signal processor of the embodiment, 100-tap output may be added to 50 tap output and 256-tap output may be added to 128-tap output, for example. As a result, the number of taps can be reduced and a processing amount can be reduced as compared with prior art that requires 4k taps, for example.

Furthermore, the reverberation adding processing, as a way of weighting, can be easily applied to the audio signal with a small processing amount by the reverberation adding circuit. Therefore, by adding artificial reverberation sound to a convergence portion of the impulse response by a simple processing, it is possible to cause the impulse response to approximate to the original impulse response.

Although an example in which the five-channel audio signals of the left front sound source LF, right front sound source RF, left back sound source LB, right back sound source RB, and central sound source CE are supplied is described in the above embodiment, the invention is not limited to this and the same effects can be obtained if the signal is slightly displaced from the five-channel positions or if a subchannel such as a superwoofer or a subwoofer is installed additionally to expand the channel to N-channel.

By the signal processing operation in the signal processor of the above embodiment, an amount of the convolution operation of the impulse responses by the digital FIR filters required to obtain the same sound field can be reduced substantially and an amount of the whole operation including the operational processing of the reverberation adding circuit in the back stage and the required number of the memories can be reduced as compared with the prior art.

Therefore, by applying the signal processor of the embodiment to the headphone device, signal processing for reproducing by reproduction by the headphone the same sound field as that in a case of listening to a reproduced sound obtained by reproducing the audio signals by speakers disposed in positions of sound sources can be achieved by using a low-priced and small-sized digital signal processing IC with low operation performance and a small number of installed memories, which was impossible by the prior art.

The invention is not limited to this and two speakers may be driven by an output left audio signal and an output right audio signal to localize an audio image formed by predetermined audio signals in a position other than the two speakers by applying the signal processor of the embodiment to a speaker device for reproducing multichannel audio signals by the two speakers disposed in front of the listener.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A signal processor for carrying out predetermined signal processing by convoluting impulse responses from sound sources to a measurement point calculated in advance by measurement or calculation to input audio signals of a plurality of channels and outputting two audio signals, said signal processor comprising:

signal processing means including means for dividing said input audio signals into two lines for respective two channels finite-tap-length FIR filters respectively for said plurality of channels, and first and second reverberation adding circuits respectively for first and second lines, an addition point provided to a tap midpoint of one of said FIR filters of one channel of said first and second lines, a delay output signal of a tap end from said FIR filter of the other channel of said first and second lines is multiplied by a predetermined multiplication coefficient and then added at said addition point, wherein an output of said FIR filter of said one channel of said first and second lines is subjected to reverberation adding processing by said first and second reverberation adding circuits of said first and second lines, and means for adding an output of said FIR filter of said other channel of said first and second lines to said output of said FIR filter of said one channel to obtain an addition output as an output signal of said first and second lines of said signal processing means.

2. A headphone device that has a signal processor for convoluting respective impulse responses from a plurality of channels including a left front sound source, a right front sound source, a left back sound source, and a right back sound source with respect to a listener to a left ear and a right ear of said listener calculated in advance by measurement or calculation to input audio signals of said respective sound sources by FIR filters to obtain an output left audio signal and an output right audio signal for driving a headphone to localize an audio image by said input audio signals to a location outside of a listener's head, wherein said signal processor includes means for dividing said input audio signals into two lines for respective two channels, finite-tap-length FIR filters respectively for said plurality of channels, and first and second reverberation adding circuits respectively for first and second lines, an addition point provided to a tap midpoint of one of said FIR filters of one channel of said first and second lines, a delay output signal of a tap end from said FIR filter of the other channel of said first and second lines is multiplied by a predetermined multiplication coefficient and then added at said addition point, wherein an output of said FIR filter of said one channel of said first and second lines is subjected to reverberation adding processing by said first and second reverberation adding circuits of said first and second lines, and means for adding an output of said FIR filter of said other channel of said first and second lines to said output of said FIR filter of said one channel to obtain addition output as an output signal of said first and second lines of said signal processor.

3. A speaker device for reproducing multichannel audio signals by two speakers disposed in front of a listener, comprising:

a signal processor for convoluting respective impulse responses from respective sound sources of said multichannel audio signals to a left ear and a right ear of said listener calculated in advance by measurement or calculation to a predetermined audio signal of said multichannel audio signals by FIR filters to obtain an output left audio signal and an output right audio signal, and means for driving said two speakers by said output left audio signal and said output right audio signal to localize an audio image by said predetermined audio signal in a position other than positions of said two speakers, wherein said signal processor includes means for dividing said input audio signals into two lines for respective two channels, finite-tap-length FIR filters respectively for said plurality of channels, and first and second reverberation adding circuits respectively for first line and second line, an addition point provided to a tap midpoint of one of said FIR filters of one channel of said first and second lines, a delay output signal of a tap end from said FIR filter of the other channel of said first and second lines is multiplied by a predetermined multiplication coefficient and then added at said addition point, wherein an output of said FIR filter of said one channel of said first and second lines is subjected to reverberation adding processing by said first and second reverberation adding circuits of said first and second lines, and means for adding an output of said FIR filter of said the other channel of said first and second lines to said output of said FIR filter of said one channel to obtain addition output as an output signal of said first and second lines of said signal processor.

* * * * *